(12) United States Patent
Castelein et al.

(10) Patent No.: US 11,071,303 B2
(45) Date of Patent: Jul. 27, 2021

(54) ELECTRICAL STUNNING METHOD WITH PROLONGED PERIOD OF UNCONSCIOUSNESS

(71) Applicant: EURO MEAT GROUP SA, Mouscron (BE)

(72) Inventors: Johan Castelein, Mouscron (BE); Stefaan Lescouhier, Mouscron (BE)

(73) Assignee: EURO MEAT GROUP SA, Mouscron (BE)

( * ) Notice: Subject to any disclaimer, the term of this patent is extended or adjusted under 35 U.S.C. 154(b) by 0 days.

(21) Appl. No.: 16/638,172

(22) PCT Filed: Aug. 8, 2018

(86) PCT No.: PCT/EP2018/071529
§ 371 (c)(1),
(2) Date: Feb. 11, 2020

(87) PCT Pub. No.: WO2019/030291
PCT Pub. Date: Feb. 14, 2019

(65) Prior Publication Data
US 2020/0359636 A1    Nov. 19, 2020

(30) Foreign Application Priority Data
Aug. 11, 2017   (BE) .................................. 2017/5553

(51) Int. Cl.
*A22B 3/00*        (2006.01)
*A22B 3/06*        (2006.01)
(Continued)

(52) U.S. Cl.
CPC ................. *A22B 3/06* (2013.01); *A22B 5/02* (2013.01); *H05C 1/04* (2013.01)

(58) Field of Classification Search
CPC ................ A22B 3/06; A22B 3/12; A22B 5/02
(Continued)

(56) References Cited

U.S. PATENT DOCUMENTS 5,326,307 A * 7/1994 Bernardus ................ A22B 3/06
                                                                452/58
5,704,830 A * 1/1998 Van Ochten ............. A22B 3/06
                                                                452/58
(Continued)

FOREIGN PATENT DOCUMENTS

EP       0190780 A1   8/1986
EP       0225149 A2   6/1987
(Continued)

OTHER PUBLICATIONS

International Search Report, dated Dec. 13, 2018, from corresponding PCT application No. PCT/EP2018/071529.
(Continued)

*Primary Examiner* — Richard T Price, Jr.
(74) *Attorney, Agent, or Firm* — Nixon & Vanderhye (57) ABSTRACT

Disclosed is an electrical stunning method that is delivered to the head of a slaughter animal. A direct and/or alternating current electric pulse or an electric pulse sequence including two or more direct and/or alternating current pulses is used in the method. Also disclosed is a slaughter method using the stunning method and a design for a device that can be used in the stunning method.

20 Claims, 4 Drawing Sheets

(51) Int. Cl.
*A22B 5/02* (2006.01)
*H05C 1/04* (2006.01)

(58) Field of Classification Search
USPC .............................................. 452/52, 57, 58
See application file for complete search history.

(56) References Cited

U.S. PATENT DOCUMENTS

| | | | | |
|---|---|---|---|---|
| 6,338,673 B2* | 1/2002 | Berry | ....................... | A22B 3/06 |
| | | | | 452/58 |
| 8,506,366 B2* | 8/2013 | Ralph | ...................... | A22B 3/00 |
| | | | | 452/58 |
| 2009/0227191 A1* | 9/2009 | Tseng | ..................... | A22B 3/086 |
| | | | | 452/58 |
| 2020/0359636 A1* | 11/2020 | Castelein | ................. | A22B 3/06 |

FOREIGN PATENT DOCUMENTS

| | | |
|---|---|---|
| GB | 2170088 A | 7/1986 |
| WO | 96/10336 A1 | 4/1996 |
| WO | 2012/065645 A1 | 5/2012 |

OTHER PUBLICATIONS

Written Opinion, dated Dec. 13, 2018, from corresponding PCT application No. PCT/EP2018/071529.

* cited by examiner

ELECTRICAL STUNNING METHOD WITH PROLONGED PERIOD OF UNCONSCIOUSNESS

TECHNICAL FIELD

The invention pertains to the technical field of stunning methods that can be used for animal slaughter. More specific, the stunning method is an electrical stunning method that is non-lethal to the animal. Particularly, the stunning method is a head-only stunning method.

BACKGROUND

Many stunning methods are known to be carried out before the slaughter of an animal. Most of the stunning methods are lethal, for example the captive bolt method causing lethal damage to the brain or electrical stunning methods causing a cardiac arrest. Some non-lethal electric stunning methods are known, but these methods only lead to a period of unconsciousness up to only one or two minutes.

For ritual slaughter of animals, for example Islamic slaughter of cattle, the stunning method needs to be non-lethal. Currently known non-lethal stunning methods cause a period of unconsciousness that may not last until the animal dies from blood loss by the traditional neck cut. Therefore no effective stunning method exists that can be incorporated in particular for the ritual slaughter of cattle.

Furthermore, the known electric stunning methods result in vigorous post-stun convulsions. These post-stun convulsions are a hazard for the operators working around the stunned animals and may result in delayed or, inaccurate neck cutting which adversely affects their welfare.

It is known in the art that head-only electric stunning causes more blood splash in the animal's muscle tissue than other stunning methods. As a result the quality of the meat is classified lower than that of meat in which another stunning method was used.

Due to increased interest in animal welfare and pressure from animal rights groups there is a need for an effective stunning method that can be used for ritual slaughter. The invention aims to provide a solution for the majority of the above mentioned problems with the current stunning methods.

SUMMARY OF THE INVENTION

In a first aspect the invention provides a method for electrically stunning an animal, comprising the steps of:
  arranging the animal's head in a head box, wherein the head box comprises electrodes, touching the animal's head;
  administering an electric pulse or electric pulse sequence to the electrodes;
  releasing the animal's head from the head box;
wherein the electric pulse is a direct and/or alternating current pulse or the electric pulse sequence comprises two or more direct and/or alternating current pulses, wherein each of said pulses may be positive or negative with respect to zero volts.

In a second aspect the invention provides a method for slaughtering animals, comprising the steps of
  confining an animal individually in a stunning pen;
  performing an electrical stunning method according to an embodiment of the invention;
  expelling said animal from the stunning pen; and
  performing a neck stick severing both carotid arteries, or a thoracic stick, severing the large blood vessels that give rise to the jugular veins and carotid arteries.

The stunning method leads to a prolonged period of unconsciousness of the animal following the administration of the electric pulse or electric pulse sequence. The period that the animal is unconsciousness is at least one minute and lasting up to 4 minutes. This period is long enough for an animal to die from the blood loss caused by a neck stick or thoracic stick. Therefore complying with the religious rules for slaughtering animals and complying with the rules for animals to be stunned before slaughter.

In a third aspect the invention provides a device for stunning and slaughtering an animal, comprising:
  a livestock crush;
  an entry at one end of the livestock crush;
  a head box, suitable to receive the animal's head, at the opposite end of the entry to the livestock crush;
  an animal expulsion gate, along the longitudinal face of the livestock crush;
wherein said head box comprises electrodes suitable to deliver a direct and/or alternating current pulse or pulse sequence.

DETAILED DESCRIPTION OF THE INVENTION

The recitation of numerical ranges by endpoints includes all numbers and fractions subsumed within that range, as well as the recited endpoints.

In a first aspect the invention provides a method for electrical stunning an animal, comprising the steps of:
  arranging the animal's head in a head box, wherein the head box comprises electrodes, touching the animal's head;
  administering an electric pulse or electric pulse sequence to the electrodes;
  releasing the animal's head from the head box;
wherein the electric pulse is a direct and/or alternating current pulse or the electric pulse sequence comprises two or more direct and/or alternating current pulses, wherein each of said pulses may be positive or negative with respect to zero volts.

The term "head box" refers to a device that holds the head of an animal and restricts the movement of the animal's head. It can be a closed box, a cage like structure that is formed around the head, or a device that restrains the movement of the neck of an animal, thus also restricting the movement of the animal's head, which latter can be supplemented with a device for lifting the chin of the animal's head and/or with a device for supporting the nose of the animal's head.

The term "direct current pulse" refers to an electrical current that flows for a certain period of time, the pulse length ($t_p$), before returning to zero. During the period the current flows the polarity of the current does not change. However, the polarity of the current may be positive or negative with respect to zero volts.

A direct current pulse is among others characterised by:
- an amplitude ($V_0$): this being the highest voltage in absolute value
- a pulse length ($t_p$): this being the time that a single pulse lasts.

The term "alternating current pulse" refers to an electrical current that flows for a certain period of time, the pulse length ($t_p$), before returning to zero. During the period the current flows the polarity of the current does change and may be positive or negative with respect to zero volts.

In a preferred embodiment, the animals are livestock animals, which are to be understood as domesticated animals raised in an agricultural setting to produce commodities such as food, fibre, and labour. Non-limiting examples of such livestock animals are cattle, swine, poultry, chickens, horses, turkeys, sheep, goats, fish, and the like.

In a particularly preferred embodiment, said livestock animals are cattle, so that a single animal is a cow. The term "cow" is used as a singular form of cattle, and refers to both female and male animals. So the meaning of a cow also refers to a bull, a steer, an ox or a heifer.

In a preferred embodiment the amplitude of said pulses is from 2000 to 22000 V, preferably from 2000 to 8000 V, more preferably from 2500 to 7500 V, even more preferably from 3000 to 7000 V, yet even more preferably from 3500 to 6500 and most preferably from 4000 to 6000 V, typically from 4500 to 5500 V.

The larger the amplitude, the more costly the equipment turns out to be. Especially when capacitors are used, increasing the voltage by 150% will lead to more than doubling the power, which implies a substantial increase in the cost and size of the capacitors.

In a preferred embodiment the stunning method is a head-only stunning method.

In a head only stunning method the electrodes are placed only around the head or neck area. The advantage of this is that it is safer for an operator to place the electrodes, as no electrodes need to be placed around the belly of the animal. Preferably, the electrodes are placed mechanically and remotely by an operator. Another advantage is that no current flows through the animal's main body, drastically reducing the risk to cause a cardiac arrest and killing the animal that way and/or of increasing the likelihood of blood splash in the tissues.

In a preferred embodiment the pulse is generated by discharging a capacitor.

The advantage is that a capacitor can store a large amount of energy that can be released in a short amount of time. The use of a capacitor to generate the pulse implies that the shape of the pulse is an exponential decay. This exponential decay is characterised by an amplitude ($V_0$) and a time constant ($\tau_0$). Preferably the exponential decay of the voltage (V) of the pulse in function of time (t) follows equation (I):

$$V = V_0 e^{(-t/\tau_0)} \tag{I}$$

The meaning of the time constant ($\tau_0$) is that it represents the elapsed time for the voltage to be reduced to 37%.

In the art it is generally regarded that the capacitor is fully discharged after 5 times the time constant ($\tau_0$).

In a preferred embodiment, the time constant ($\tau_0$) is given by the product of the resistance (R) of the total electrical circuit and the capacitance (C) of the capacitor.

The resistance is determined by the animal's head. The resistance depends amongst others on the kind of animal, the size of the animal, the condition of the animal and on the quality and area of contact between electrode and animal. In this stunning method it is difficult to influence the resistance as it is largely dependent on the animal.

In a preferred embodiment, the capacitance (C) of the capacitor is 2500 to 4500 µF, preferably 3000 to 4000 µF, and more preferably 3250 to 3750 µF.

As the resistance is mostly a given parameter, depending on the animal the pulse length can be influenced by changing the capacitance of the capacitor.

In a preferred embodiment, the energy of the electric pulse or electric pulse sequence is 30 to 70 kJ, preferably 40 to 60 kJ, and more preferably 45 to 55 kJ.

The energy (E) of the pulse generated by a capacitor depends on the capacitance (C) of the capacitor and the amplitude of the voltage ($V_0$) according to equation (II):

$$E = \tfrac{1}{2} C V_0^2 \tag{II}$$

In a preferred embodiment, the pulse length of a single pulse is 0.25 to 1000 ms, preferably 25 to 1000 ms, more preferably 50 to 750 ms, even more preferably 75 to 500 ms, yet even more preferably 100 to 400 ms and most preferably 150 to 300 ms, typically from 200 to 250 ms.

Pulse length as in the above mentioned ranges causes neuronal membrane disruption, not leading to the death of the animal.

In a preferred embodiment, only one pulse is administered to the electrodes in the method according to the first aspect of the present invention. The administration of one single pulse is straightforward and simple. If a single pulse would prove insufficient to achieve a sufficiently prolonged period of unconsciousness of the animal, more than one pulse, or, in other words, a pulse sequence can be applied. In a preferred embodiment the pulse sequence comprises multiple pulses with 10 to 1000 ms between two pulses, preferably 50 to 800 ms between two pulses, more preferably 100 to 600 ms between two pulses, even more preferably 150 to 500 ms and most preferably 200 to 400 ms between two pulses, typically from 250 to 350 ms between two pulses, like 300 ms.

In a preferred embodiment the amplitude of a subsequent pulse is a fraction of previous pulse, wherein said fraction is 0.5 to 1.5, preferably from 0.6 to 1.4, more preferably from 0.7 to 1.3, even more preferably from 0.8 to 1.2 and most preferably from 0.9 to 1.1.

In a preferred embodiment the pulse sequence comprises two pulses, a first pulse and a second pulse, preferably with the second pulse having an opposite polarity from the first pulse.

In a preferred embodiment the total energy is divided over multiple pulses, preferably two pulses, and more preferably two pulses with an opposite polarity.

In a preferred embodiment the pulse sequence comprises two pulses with an exponential decaying shape, with an amplitude from 2000 to 15000 V and a time constant from 0.5 to 220 ms.

In a preferred embodiment the pulse sequence comprises two pulses with an exponential decaying shape, with an amplitude from 3000 to 7000 V and a time constant from 30 to 80 ms.

In a preferred embodiment the pulse sequence comprises two pulses with an exponential decaying shape, with an amplitude from 4000 to 6000 V and a time constant from 40 to 70 ms.

In a preferred embodiment the pulse sequence comprises two pulses with an exponential decaying shape, with an amplitude from 4500 to 5500 V and a time constant from 40 to 70 ms.

In a preferred embodiment the pulse sequence comprises two pulses with an exponential decaying shape, with an amplitude from 2000 to 8000 V, a time constant from 10 to 100 ms and 10 to 1000 ms between the two pulses.

In a preferred embodiment the pulse sequence comprises two pulses with an exponential decaying shape, with an amplitude from 3000 to 7000 V, a time constant from 30 to 80 ms and 150 to 500 ms between the two pulses.

In a preferred embodiment the pulse sequence comprises two pulses with an exponential decaying shape, with an amplitude from 4000 to 6000 V, a time constant from 40 to 70 ms and 200 to 400 ms between the two pulses.

In a preferred embodiment the pulse sequence comprises two pulses with an exponential decaying shape, with an amplitude from 4500 to 5500 V, a time constant from 40 to 70 ms and 200 to 400 ms between the two pulses.

In a preferred embodiment the pulse shape is rectangular, cosine squared, Gaussian, triangle or saw tooth.

In a preferred embodiment the head box comprises a first and a second electrode, wherein said first electrode is placed in the head box so that it makes contact with the animal's, nose, forehead, temple, chin, cheek lower mandible or front part of the neck, more preferably nose, forehead or temple and most preferably nose.

In a preferred embodiment said second electrode is placed in the head box so that it makes contact with the animal's opposite temple, opposite cheek, back of the neck, back of the head, top of the head, behind the ears, more preferably opposite temple, back of the neck, behind the ears and most preferably the back of the neck.

In an alternative preferred embodiment the head box comprises three electrodes, one placed in the nose area and the other two behind the ears or around the neck.

This causes the current to travel through the head and through the brain, yielding in a higher success rate for stunning the animals. When electrodes are placed more towards the sides of the head, the current can flow in a way that it avoids certain areas of the brain or go around the brain completely, yielding to a less favourable success rate for stunning the animals. In fact, Council Regulation (EC) No. 1099/2009 prohibits any electric current application that does not span the brain.

In a preferred embodiment the head box comprises a head bail.

The head bail locks around the animal's neck, and is used to fix the head box to the animals head. Preferably the head bail comprises electrodes making contact with the neck.

In a preferred embodiment electrical insulation is placed between the electrodes and the head box itself. This to avoid that the current or part of the current travels through the material of the head box, avoiding the head of the animal and therefore lowering the success rate of stunning. For said electrical insulation, any suitable kind of insulation material as known in the state of the art may be selected. Non-limiting examples of insulation materials include polypropylene and polyamide. In a preferred embodiment, polyamide is selected as electrical insulation.

In a second aspect the invention provides a method for slaughtering animals, comprising the steps of
confining an animal to a stunning pen;
performing an electrical stunning method according to an embodiment of the invention;
expelling said animal from the stunning pen; and
performing a neck stick, severing both carotid arteries, or a thoracic stick, severing the large blood vessels that give rise to the jugular veins and carotid arteries.

The stunning method leads to a prolonged unconsciousness of the animal following the administration of the electric pulse or electric pulse sequence. The period that the animal is unconsciousness is at least 1 minute, preferably at least 2 minutes, and lasting up to 3 minutes, preferably lasting up to 4 minutes. This period is long enough for an animal to die from the blood loss caused by a neck stick or thoracic stick. Therefore complying with the religious rules for slaughtering animals and complying with the rules for animals to be stunned before slaughter.

The stunning method allows the animal to regain consciousness after stunning. It is observed that animals make full recovery after regaining consciousness. This demonstrates that the stunning method is non-lethal and therefore suitable for stunned religious slaughter.

The stunning method has the effect that the animals don't suffer from a cardiac arrest, meaning that cardiac arrest (ventricular fibrillation) is not the cause of death of the animal. Especially for religious slaughter, it is important that the cause of death of the animal is a traditional neck stick or a thoracic stick.

Compared to the electrical stunning known in the art, this stunning method drastically reduces the amount of post-stun convulsions and the magnitude of the convulsions. This makes it safer for operators to work around the stunned animals. Traditionally the animals are shackled and hoisted to an overhead rail in order to attempt to provide a safe workspace around them after stunning. In a preferred embodiment of the method the convulsions are absent after stunning and the animals can be safely handled. Another advantage of the reduction of the post-stun convulsions is that the operator can apply the neck stick or thoracic stick faster after stunning, reducing the stunning-sticking interval and making sure that the period that the animal is unconscious is long enough for sticking and death occurs as a consequence of the sticking. Yet another advantage of the reduction of the post-stun convulsions is that the animals move less and do not make as much unpredictable movements, so that the neck stick or thoracic stick can be applied more precisely.

The effect of the short, high voltage, direct and/or alternating current pulses applied to the head is that the brain cells undergo neural membrane disruption which is reversible and non-lethal. The result of this is that the animal loses consciousness only temporarily. It is known in the art that electrical stunning methods with alternating currents induce tonic-clonic epilepsy, which results in heavy post-stun convulsions.

The method can be incorporated in Dhabihah, allowing stunned slaughter according to the Islamic tradition, resulting in halal meat.

The method results in an improved carcass quality and an improved meat quality. Compared to the electrical stunning methods known in the art, the muscle tissue has lower levels of blood splash. Also the levels of blood speckle in fat and connective tissue were remarkably lower compared to electrical stunning methods known in the art. In addition, the lack of direct muscle stimulation will result in significantly less broken bones. The teachings in the art suggest that head-only stunning results in a lower amount of blood splash compared to head to back stunning, as taught by "Quality and Grading of Carcasses of Meat Animals", by S. Morgan Jones page 54-55.

In a third aspect the invention provides a device for stunning and slaughtering an animal, comprising:
- a livestock crush;
- an entry at one end of the livestock crush;
- a head box, suitable to receive the animal's head, at the opposite end of the entry to the livestock crush;
- an animal expel gate, along the longitudinal face of the livestock crush;

wherein said head box comprises electrodes suitable to deliver a direct and/or alternating current pulse or pulse sequence.

Preferably the design of the head box is the same as in the first aspect of the invention.

In a preferred embodiment is said device suitable to be used in a stunning method according to an embodiment of the invention.

In a fourth aspect the invention provides meat obtained by an electrical stunned slaughter method, wherein the blood splash in the meat and broken bones, as visually observed, is low.

The term "electrical stunned slaughter method" refers to any slaughter method that uses an electrical stunning method to stun the animal before slaughter.

The low blood splash and absence of broken bones with associated haemorrhage results in a higher qualification of the meat quality. The blood splash affects the shelf life of the meat and due to its appearance, will be rejected by consumers. Besides, the quality of meat according to the fourth aspect of the invention can be determined by measuring several parameters, among which, for example, colour, texture, tenderness and colour stability. The latter parameters are strongly dependent on species and age of animals, and should be interpreted from case to case.

In a preferred embodiment the meat is obtained from a slaughter method using an electrical stunning method according to an embodiment of the invention.

The invention is further described by the following non-limiting examples which further illustrate the invention, and are not intended to, nor should they be interpreted to, limit the scope of the invention.

Example 1

Figure 1:
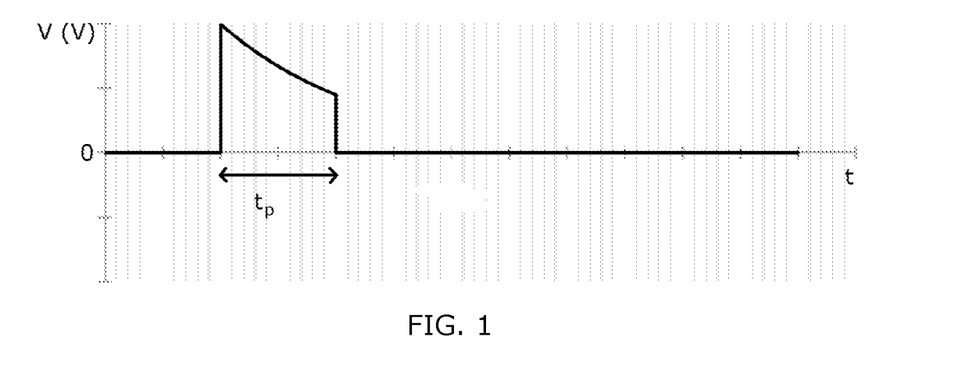
FIGS. 1 to 3 show different pulse sequences that are used in embodiments of the invention.

FIG. 1 shows a pulse according to an embodiment of the invention, which pulse exponentially decays to a certain voltage, after which it is reduced abruptly to zero volt. The voltage has been plotted in function of time. $T_p$ represents the pulse length.

Example 2

Figure 2:
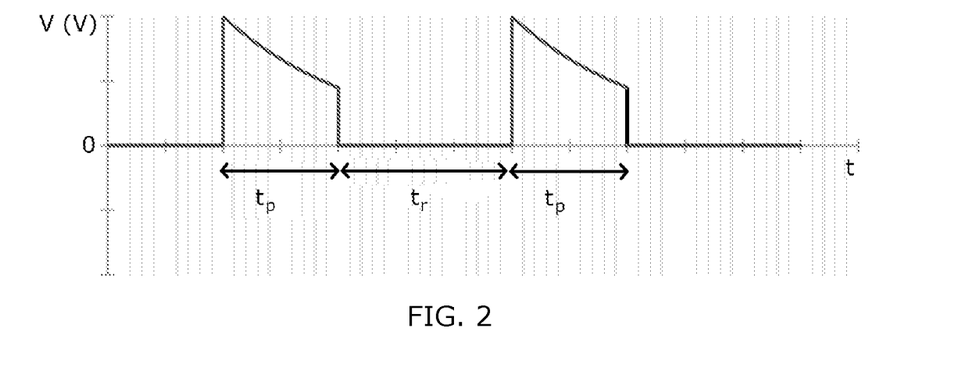

FIG. 2 shows a pulse sequence according to an embodiment of the invention, comprising two pulses that at first decay exponentially, and secondly are reduced abruptly to zero volt. The time between the 2 pulses is represented by $t_r$.

Example 3

Figure 3:
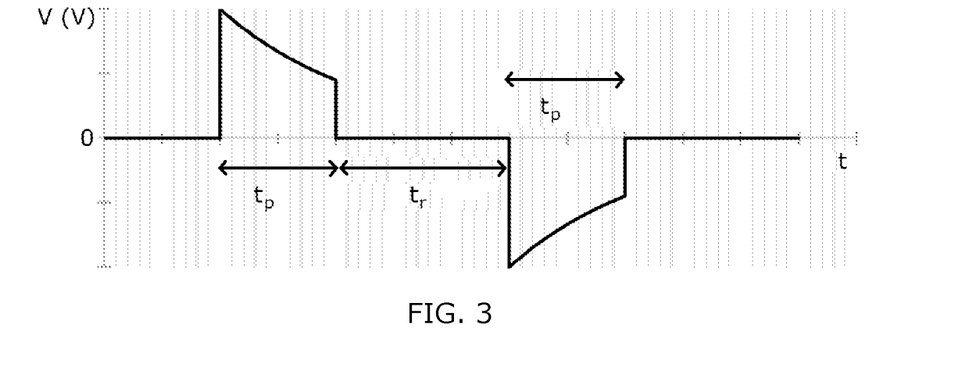

FIG. 3 shows a pulse sequence according to an embodiment of the invention, comprising two pulses that at first decay exponentially, and secondly are being reduced abruptly to zero volt, of which the last pulse has an opposite polarity of the first one.

Example 4

Figure 4:
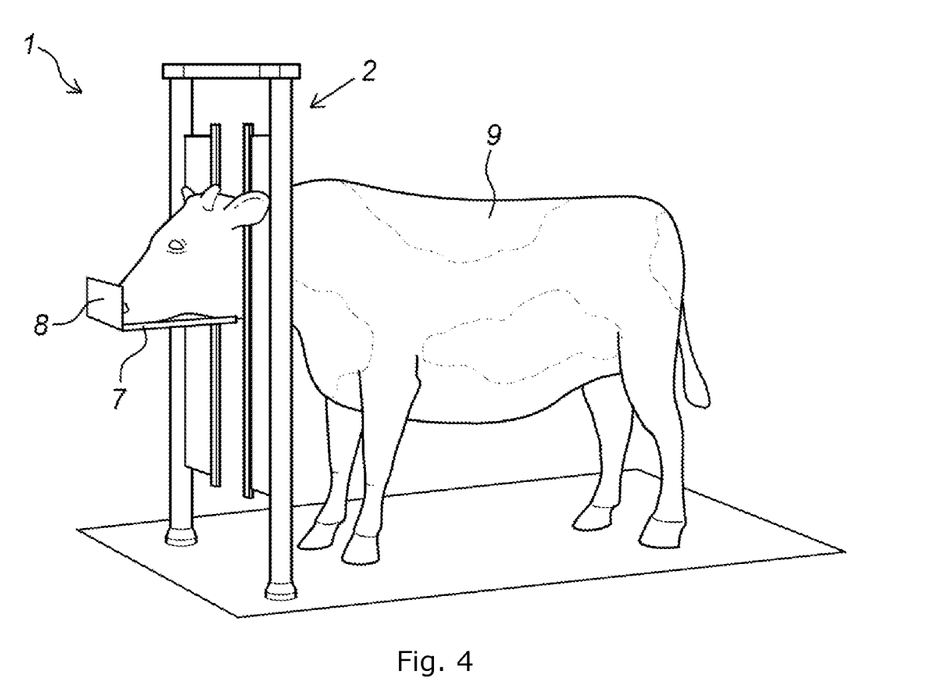
FIG. 4 shows a device for stunning and slaughtering an animal, according to embodiments of the present invention.
Figure 5:
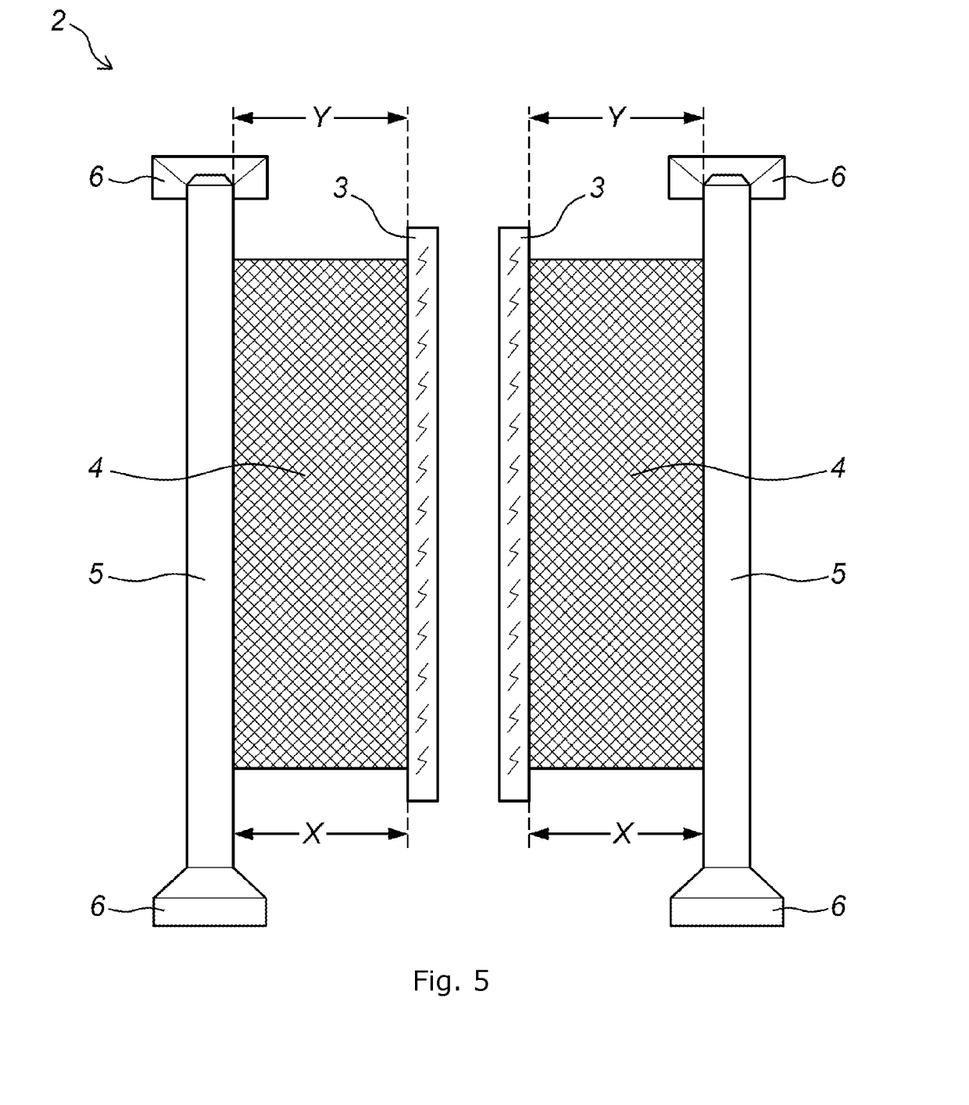
FIG. 5 shows a detail of a neck restraint of a device for stunning and slaughtering an animal, according to embodiments of the present invention.

Example 4 concerns a device for stunning and slaughtering an animal, according to embodiments of the present invention. Such device 1 is shown in FIG. 4. The device comprises a neck restraint 2 for restraining the neck and thus the head of an animal, in particular a cow 9, an insulated chin lift 7 for lifting the chin of said head, and a nose plate electrode 8. A detail of said chin lift 7 and nose plate electrode 8 is presented in FIG. 6. FIG. 5 shows a detail of said neck restraint 2. The neck constraint 2 comprises two identical and opposed parts, each part comprising a bar 5 connected to a neck electrode 3 through an insulation sheet 4, which bar 5 is provided with an insulation block 6 on each of its ends. Between said opposed parts of said neck restraint 2, the neck of a cow 9 can be restrained.

Figure 6:
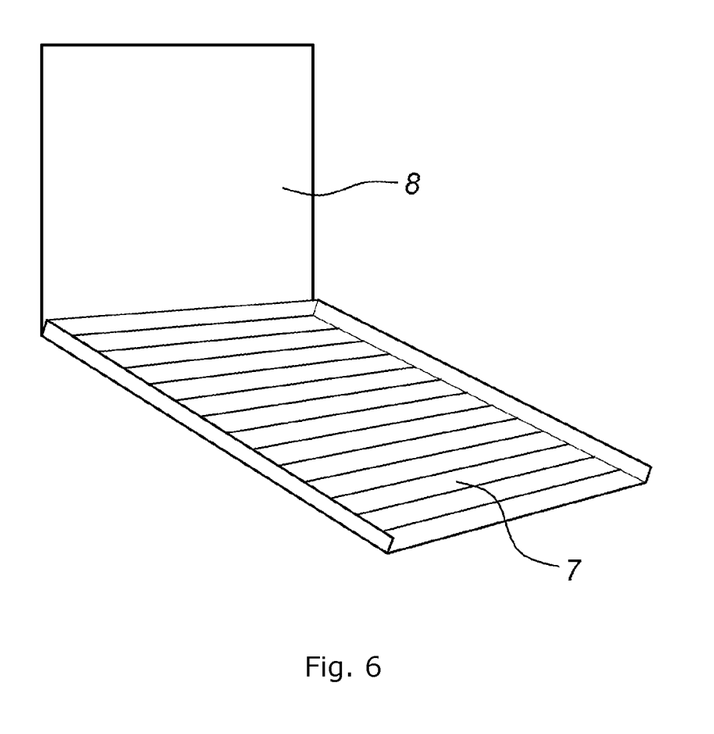
FIG. 6 shows a detail of a chin lift and nose plate electrode of a device for stunning and slaughtering an animal, according to embodiments of the present invention.

The combination of neck restraint 2, chin lift 7 and nose plate electrode 8 can be regarded as an embodiment of a head box according to the invention. Said insulation sheets 4 and blocks 6, and insulated chin lift 7 are preferably provided in polyamide. They are provided to avoid the current or at least part of the current, as can be applied by said neck electrodes 3 and nose plate electrode 8, travelling through the bars 5 of the neck restraint 2, avoiding the head of the cow 9 and therefore lowering the success rate of stunning.

Each insulation sheet 4 of the neck restraint 2 possesses a certain width X. Each neck electrode 3 is movable along a dimension Y, corresponding to said width X. For example, movement of the neck electrodes 3 may be performed by rolling these electrodes 3 around the bars 5 to which they are connected. Movement of said neck electrodes 3 is preferably performed automatically.

By movement of said neck electrodes 3, the electrodes 3 can be brought to an optimal distance with regard to the neck of said cow 9. Preferably, said nose plate electrode 8 is also movable, more preferably in an automated manner, such that said nose plate electrode 8 can be brought to an optimal distance with regard to the nose of said cow 9. Said neck electrodes 3 and nose plate electrode 8 both function to restrict the movement of the head of the cow 9, as to apply an electrical current through the head of the cow 9.

Due to its specifications, the device 1 according to Example 4 is ideally suited for electrical stunning of the cow 9 according to the method according to invention, leading to a period of unconsciousness of the cow 9 of at least 1 minute, preferably at least 2 minutes, more preferably at least 3 minutes, even more preferably at least 4 minutes and most preferably at least 5 minutes. During this long period of unconsciousness, the cow 9 may be slaughtered efficiently. This is especially suited for traditional slaughter.

The following provides an overview of the symbols and reference numbers used in the figures:
1 device for stunning and slaughtering an animal
2 neck restraint
3 neck electrode of neck restraint
4 insulation sheet
5 bar
6 insulation block
7 insulated chin lift
8 nose plate electrode
9 cow
X width of insulation sheet
Y dimension among which a neck electrode is movable
t time
$t_p$ pulse length
$t_r$ time between two pulses
V voltage

The invention claimed is:
1. Method for electrical stunning an animal (9), comprising the steps of:

arranging the animal's head in a head box, wherein said head box comprises electrodes (3, 8), touching the animal's head;

administering an electric pulse or electric pulse sequence to the electrodes;

releasing the animal's head from the head box;

wherein the electric pulse is a direct and/or alternating current pulse or the electric pulse sequence comprises two or more direct and/or alternating current pulses, wherein each of said pulses may be positive or negative with respect to zero volts, and wherein the amplitude of said pulses is from 2000 to 22000 V.

2. The method according to claim 1, wherein said animal is a livestock animal.

3. The method according to claim 2, wherein said livestock animal is a cow (9).

4. Meat obtained by an electrical stunned slaughter method, wherein the blood splash in the meat and broken bones, as visually observed, is low, and wherein the electrical stunning method is a method according to claim 1.

5. The method according to claim 2, wherein the pulse is generated by discharging a capacitor.

6. The method according to claim 1, wherein the pulse is generated by discharging a capacitor.

7. The method according to claim 1, wherein the energy of the electric pulse or electric pulse sequence is from 30 to 70 kJ.

8. The method according to claim 1, wherein the pulse length is 0.25 to 1000 ms.

9. The method according to claim 1, wherein the pulse sequence comprises multiple pulses with 10 to 1000 ms between two pulses.

10. The method according to claim 1, wherein the amplitude of a subsequent pulse is a fraction of previous pulse, wherein said fraction is from 0.5 to 1.5.

11. The method according to claim 1, wherein the pulse sequence comprises two pulses, a first pulse and a second pulse.

12. The method according to claim 1, wherein the total energy is divided over multiple pulses.

13. The method according to claim 1, wherein the pulse shape is rectangular, cosine squared, Gaussian, triangle or saw tooth.

14. The method according to claim 1, wherein said head box comprises at least a first and a second electrode and wherein said first electrode is placed in the head box so that said first electrode makes contact with the animal's nose, forehead, temple, chin, cheek, lower mandible or front part of the neck.

15. The method according to claim 14, wherein said second electrode is placed in the head box so that said second electrode makes contact with the animal's opposite temple, opposite cheek, back of the neck, back of the head, top of the head, behind the ears.

16. The method according to claim 1, wherein the head box comprises three electrodes (3, 8), one placed in the nose area and the other two behind the ears or around the neck.

17. Method for slaughtering animals, comprising the steps of confining an animal (9) individually in a stunning pen performing an electrical stunning method according to claim 1;

expelling said animal (9) from the stunning pen; and performing a neck stick, severing both carotid arteries, or a thoracic stick, severing the large blood vessels that give rise to the jugular veins and carotid arteries.

18. Device for stunning and slaughtering an animal (9), comprising:

a livestock crush;

an entry at one end of the livestock crush;

a head box, suitable to receive the animal's head, at the opposite end of the entry to the livestock crush;

an animal expel gate, along the longitudinal face of the livestock crush;

wherein said head box comprises electrodes (3, 8) suitable to deliver a direct and/or alternating current pulse or pulse sequence, and wherein said device is suitable to be used in a method according to claim 1.

19. The method according to claim 1, wherein the total energy is divided over two pulses.

20. The method according to claim 1, wherein the total energy is divided over two pulses with an opposite polarity.

* * * * *